United States Patent
Hutson

(10) Patent No.: US 10,281,930 B2
(45) Date of Patent: May 7, 2019

(54) GIMBALED UNIVERSAL DRONE CONTROLLER

(71) Applicant: QUALCOMM Incorporated, San Diego, CA (US)

(72) Inventor: Donald Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/219,116

(22) Filed: Jul. 25, 2016

(65) Prior Publication Data
US 2018/0024570 A1    Jan. 25, 2018

(51) Int. Cl.
| | |
|---|---|
| G05D 1/10 | (2006.01) |
| B64C 39/02 | (2006.01) |
| B64D 47/08 | (2006.01) |
| G01C 21/18 | (2006.01) |

(52) U.S. Cl.
CPC ........... G05D 1/101 (2013.01); B64C 39/024 (2013.01); B64D 47/08 (2013.01); G01C 21/18 (2013.01); *B64C 2201/00* (2013.01); *B64C 2201/108* (2013.01); *B64C 2201/141* (2013.01); *B64C 2201/146* (2013.01)

(58) Field of Classification Search
CPC ........ G05D 1/101; B64D 47/08; G01C 21/18; B64C 39/024; B64C 2201/108; B64C 2201/146; B64C 2201/141
See application file for complete search history.

(56) References Cited

U.S. PATENT DOCUMENTS

| | | |
|---|---|---|
| 9,382,002 B1 | 7/2016 | Cavote |
| 2005/0004723 A1 | 1/2005 | Duggan et al. |

(Continued)

FOREIGN PATENT DOCUMENTS

| | | |
|---|---|---|
| EP | 2813428 A1 | 12/2014 |
| WO | 2015149079 A1 | 10/2015 |

(Continued)

OTHER PUBLICATIONS

International Search Report and Written Opinion—PCT/US2017/033787—ISA/EPO—dated Aug. 14, 2017.

*Primary Examiner* — Rodney A Butler
(74) *Attorney, Agent, or Firm* — The Marbury Law Group, PLLC

(57) ABSTRACT

Various embodiments are disclosed of a device for use on an unmanned aerial vehicle (drone) including two or more gimbals, a gimbal processor, an inertial measurement unit, and a communication connection. The two or more gimbals are pivotally coupled to rotate orthogonally relative to each other. An inner gimbal of the two or more gimbals may support an inner platform for receiving components thereon. An outer gimbal of the two or more gimbals may be pivotally coupled to the drone. The gimbal processor is mounted on the inner platform, wherein the gimbal processor is configured to control pivotal movement of the two or more gimbals. The inertial measurement unit may be fixed relative to the inner platform and coupled to the gimbal processor. The communication connection may be coupled to the gimbal processor and configured to exchange signals with the drone for controlling operations.

21 Claims, 8 Drawing Sheets

(56) References Cited

U.S. PATENT DOCUMENTS

| | | | |
|---|---|---|---|
| 2007/0194170 A1* | 8/2007 | Ellison | F16M 11/10 244/3.1 |
| 2010/0228406 A1 | 9/2010 | Hamke et al. | |
| 2014/0336848 A1 | 11/2014 | Saund et al. | |
| 2014/0371952 A1 | 12/2014 | Ohtomo et al. | |
| 2016/0014309 A1* | 1/2016 | Ellison | G02B 27/644 248/550 |
| 2016/0159463 A1* | 6/2016 | Wang | B64C 19/00 701/2 |
| 2016/0171330 A1* | 6/2016 | Mentese | G06K 9/3233 348/170 |
| 2016/0356574 A1* | 12/2016 | Tebay | F41G 3/22 |
| 2017/0144758 A1* | 5/2017 | Myslinski | B64C 39/024 |
| 2017/0158338 A1* | 6/2017 | Sweeny | B64C 25/58 |
| 2017/0163896 A1* | 6/2017 | Kang | H04N 5/23287 |
| 2017/0234725 A1* | 8/2017 | Ichikawa | G01C 19/5642 73/658 |
| 2017/0235308 A1* | 8/2017 | Gordon | G05D 1/0016 701/2 |

FOREIGN PATENT DOCUMENTS

| | | | | |
|---|---|---|---|---|
| WO | 2015200209 A1 | 12/2015 | | |
| WO | WO 2016111595 A1 * | 7/2016 | | B64C 39/02 |

* cited by examiner

GIMBALED UNIVERSAL DRONE CONTROLLER

BACKGROUND

Many unmanned vehicles like unmanned aerial vehicles (referred to herein as "drones") have a central flight controller in the main body with a separate gimbal fitted with cameras and sensors. Conventional drones require complicated onboard sensor wiring, which must be fed through small pivot points. Wiring the onboard sensors is made even more difficult by the fact that multiple sensors are typically included in the gimbal of a drone. Since the central flight controller is generally remote from the gimbal, the gimbal must be run slowly to avoid losing position and attitude synchronization with the central flight controller.

SUMMARY

Various embodiments are disclosed of a device for use on drone including two or more gimbals, a gimbal processor, at least one inertial measurement unit, and a communication connection. The two or more gimbals are pivotally coupled to rotate orthogonally relative to each other. An inner gimbal of the two or more gimbals supports an inner platform for receiving components thereon. An outer gimbal of the two or more gimbals pivotally couples to the drone. The gimbal processor is mounted on the inner platform, wherein the gimbal processor is configured to control pivotal movement of the two or more gimbals. The at least one inertial measurement unit is fixed relative to the inner platform and coupled to the gimbal processor. The communication connection is coupled to the gimbal processor and configured to exchange signals with the drone for controlling flight parameters of the drone.

Some embodiments may include separate gimbal drivers coupled to the two or more gimbals. Each of the separate gimbal drivers may be controlled by the gimbal processor and may be configured to rotate an individual one of the two or more gimbals. The gimbal processor may coordinate the operations of the drone with a drone processor of the drone. The drone processor may operate as a slave to the gimbal processor operating as a master. At least one camera may be fixed to the inner one of the two or more gimbals and may be coupled to the gimbal processor. The at least one camera may be configured to capture an image of a heading of the device. gimbal The at least one inertial measurement unit may be configured to determine an attitude and/or heading of the device relative to surroundings of the drone. The at least one inertial measurement unit may be configured to determine at least one of a position or movement of the components of the drone relative to the device.

In some embodiments, a camera may be coupled to the inner platform and the gimbal processor. The camera may be configured to capture an image of a heading of the device. A vibration sensor may be included that may be configured to detect vibrations between the inner platform and the drone.

In some embodiments, the two or more gimbals may pivot concentrically. In addition, the two or more gimbals may include three or more gimbals.

Further embodiments include methods of manufacturing a device, such as a gimbal universal drone controller, and a drone using such a device. Such embodiments may include coupling two or more gimbals to rotate orthogonally relative to each other, in which an inner gimbal of the two or more gimbals supports an inner platform for receiving components thereon, and in which an outer gimbal of the two or more gimbals pivotally couples to the drone. Such embodiments may further include mounting a gimbal processor on the inner platform, with the gimbal processor configured to control pivotal movement of the two or more gimbals, and fixing an inertial measurement unit (IMU) relative to the inner platform and coupled the IMU to the gimbal processor. Such embodiments may further include coupling a communication connection to the gimbal processor, in which the communication connection is configured to exchange signals with the drone for controlling operations of the drone.

Methods of manufacturing a drone may then include connecting the a gimbal universal drone controller to the drone so that the gimbal processor can provide control signals to controllable components on the drone. In some embodiments, coupling the device to the drone may include mechanically attaching the device to a structure of the drone, and connecting drone sensor outputs and controllable components to the communication connection.

In some embodiments, coupling two or more gimbals to rotate orthogonally relative to each other may include coupling separate gimbal drivers to the two or more gimbals and coupling the separate gimbal drivers to the gimbal processor, in which each of the separate gimbal drivers is configured to rotate an individual one of the two or more gimbals.

Some embodiments may further include fixing at least one camera to the inner one of the two or more gimbals and coupling the at least one camera to the gimbal processor, wherein the at least one camera is configured to capture an image of a heading of the device. In such embodiments, fixing at least one camera to the inner one of the two or more gimbals may include fixing the at least one camera to the inner one of the two or more gimbals so that the at least one camera is oriented to capture an image of a heading of the device.

Some embodiments may further include attaching a vibration sensor to the device, the vibration sensor configured to detect vibrations between the inner platform and the drone. In some embodiments, coupling two or more gimbals to rotate orthogonally relative to each other may include coupling three or more gimbals to rotate orthogonally relative to each other.

Further embodiments may include a gimbaled universal drone controller having means for performing functions of the device and/or methods described above. Further embodiments include a non-transitory processor-readable storage medium having stored thereon processor-executable instructions configured to cause a processor to perform operations of the above-discussed methods.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
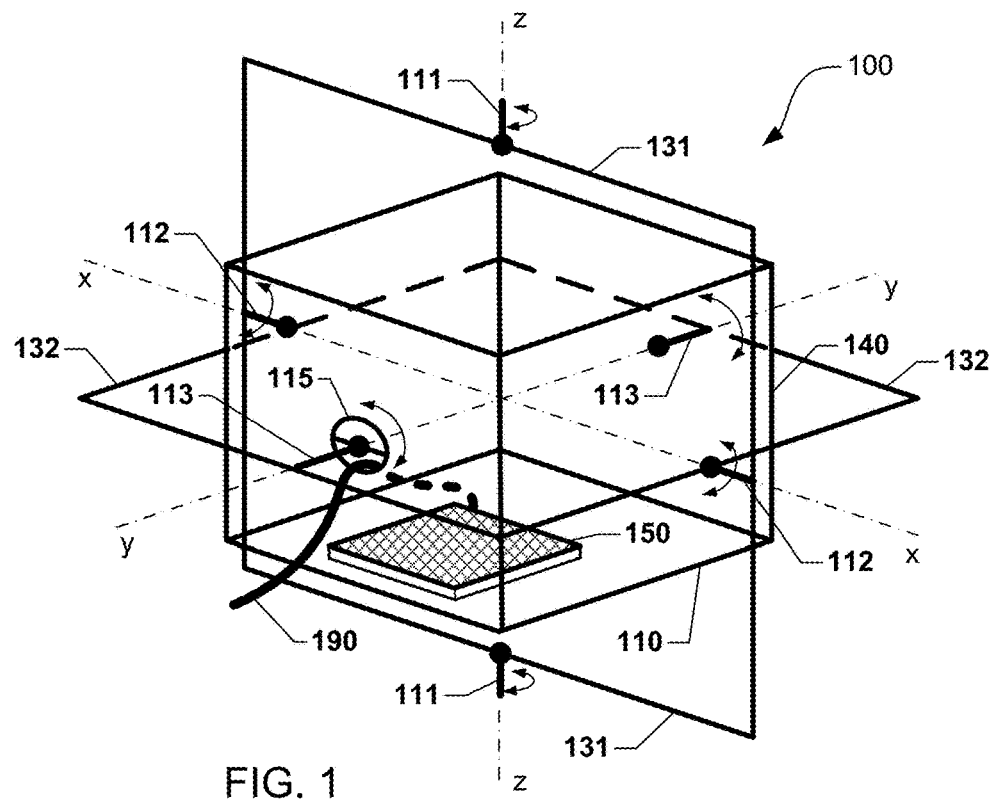
FIG. 1 is a schematic perspective view of a gimbaled universal drone controller according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a gimbaled universal drone controller for use on a drone (e.g., an aerial drone or other type of unmanned vehicle) that includes two or more gimbals controlled by a gimbal processor fixed within an innermost one of the two or more gimbal. The gimbal processor may determine an absolute position of the gimbaled universal drone controller using an inertial measurement unit (IMU) coupled to the gimbal processor. In addition, the gimbal processor may determine a relative position of the drone for controlling attitude, movement, and stability control of the drone.

A gimbaled universal drone controller according to various embodiments may reduce the amount of control wiring needed for a drone and shorten the control wiring used, and thus may lighten the drone and enhance the speed of communications between a gimbal processor and various components of the drone. In addition, the drone may benefit from enhanced heating and cooling, better control of condensation, better prevention of fogging of the lenses, and better shielding that may be used with communication systems (e.g., Wi-Fi, GPS, etc.). The reduction in the number and/or size of wiring holes or leads needed for coupling the gimbal processor to other components of a drone may provide these and other benefits.

Various embodiments may be implemented in aerial drones or drones to overcome shortcomings in the gimbals. Conventional flight controllers that are remote from gimbals generally experience different dampening and/or vibration effects than gimbals. Consequently conventional flight controllers will occasionally move relative to the gimbals, leads to inaccuracies in positioning and/or orientation controls. In contrast to such conventional components, the various embodiments include a gimbaled universal drone controller located within the gimbal assembly. Such a configuration may provide tighter calibration between the gimbal assembly and the drone controller. In addition, sensors (e.g., optic flow, 4K, and depth-from-stereo sensors) remain motionless relative to the gimbal, enabling movement to new vectors as needed without having to adjust for relative motion of drone motion sensors (e.g., accelerometers and gyroscopes) and gimbal sensors.

Various embodiments of a universal gimbaled drone controller may be implemented in any of a variety of unmanned autonomous and semi-autonomous vehicles, including aerial drones, land-based unmanned vehicles, space vehicles, and waterborne unmanned vehicles. Configurations and advantages of the various embodiments may apply equally to autonomous and semi-autonomous vehicles operating in any of these environments. For ease of description, various embodiments will be referred to generally herein as drones and described for illustrative purposes with reference to aerial drones. However, the use of aerial drones as an example implementation or application of various embodiments are not intended to limit the scope of the claims to aerial vehicle applications unless an aerial drone or aerial drone application is specifically recited in a claim.

By integrating a gimbal assembly with a drone controller into a single package, control algorithms for holding the gimbal fixed on a target may be simplified as gimbal movement and flight attitude controls can be processed in an integrated manner. For example, the gimbaled universal drone controller in accordance with various embodiments may trade off vehicle movements for gimbal movements and vice versa to maintain a required gimbal attitude.

As used herein, the term "gimbal" refers to a pivoted support that allows the rotation of an object about a single axis. A set of two or more gimbals (typically three), one mounted on the other with orthogonal pivot axes, may be used to allow an object mounted on the innermost gimbal to remain independent of the rotation of a support to which the outermost gimbal is fixed. The term "gimbal" refers to a component mounted on a gimbal and supported by one or more gimbals. For example, the term "gimbal processor" is used herein to refer particularly to one or more processors supported by two or more gimbals.

As used herein, the term "drone" refers to one of various types of autonomous vehicles (e.g., autonomous aircraft, land vehicles, waterborne vehicles, or a combination thereof) that may operate without onboard human pilots/drivers. A drone may include an onboard computing device configured to fly and/or operate the drone without remote operating instructions (i.e., autonomously), such as from a human operator or remote computing device. Alternatively, the computing device onboard the drone may be configured to receive operating instructions and/or updates to instructions from a gimbaled universal drone controller in accordance with various embodiments.

The drone may be propelled for flight and/or other movement in any of a number of known ways. For example, a plurality of propulsion units, each including one or more rotors, may provide propulsion or lifting forces for the drone and any payload carried by the drone. In addition, the drone may include wheels, tank-treads, or other non-aerial movement mechanisms to enable movement on the ground, over water, under water, or a combination thereof. Further, the drone may be powered by one or more types of power source, such as electrical, chemical, electro-chemical, or other power reserve, which may power the propulsion units, the onboard computing device, and/or other onboard components.

As used herein, the term "controller" refers generally to a computing device configured to direct and/or regulate operations of electronic components coupled thereto. As used herein, the term "gimbaled universal drone controller" refers to a device that includes a gimbaled controller configured to be a primary or exclusive controller of a drone.

As used herein, the terms "inertial measurement unit" and "IMU" refer interchangeably to an electronic device that measures and reports a body's accelerations in three dimensions, angular rates in three axes of rotation, and sometimes the magnetic field surrounding the body. An IMU may include sensors selected from a group including cameras, accelerometers, magnetometers, and other position sensors.

FIG. 1 illustrates a schematic representation of a gimbaled universal drone controller 100 for use on a drone (e.g., 600 in FIGS. 6, 7A, and 7B) and configured to control operations of the drone according to various embodiments. The gimbaled universal drone controller 100 may include two or more gimbals pivotally coupled to rotate orthogonally relative to each other. In some embodiments, the gimbaled universal drone controller 100 may include three gimbals 111, 112, 113 that are configured to rotate about an x-axis, a y-axis, and a z-axis, respectively.

The three gimbals 111, 112, 113 include gimbal arms 131, 132 (i.e., yokes) that extend between and pivotally couple the three gimbals 111, 112, 113 to one another. An outer gimbal 111 may be pivotally coupled to the drone. An inner gimbal 113 supports an inner platform 110 for receiving components thereon. For example, the inner platform may support a control unit 150 that may include various circuits and devices used to control the operation of the drone (e.g., a gimbal processor and an inertial measurement unit), as well as other components of the gimbaled universal drone controller 100 (e.g., internal motors that drive the gimbals 111, 112, 113). The inner platform 110 and any components thereon will remain fixed relative to the inner gimbal 113. The inner platform 110 may be a distinct element or a part of and/or integrally formed with a component housing 140. In addition, the gimbaled universal drone controller 100 may include one or more wired connections 190 coupling the control unit 150 to a flight controller of the drone. The one or more wired connections 190 may be configured to exchange signals with the drone for actively controlling stabilization thereof. Thus, the control unit 150 may use the wired connection 190 to transmit commands and/or data to the drone, as well as receive inputs from the drone. Additionally, the one or more wired connections 190 may supply power to the gimbaled universal drone controller 100 from the drone or other external source.

While the component housing 140 is illustrated as a three-dimensional block, numerous other shapes or configurations may be used to support the components of the gimbaled universal drone controller 100 in accordance with various embodiments. The component housing 140 may have one or more wiring ports 115 for passing wires and connections (e.g., the wired connection 190) between an inner part of the component housing 140 and an outer part thereof. Alternatively, the wired connection 190 may include a slip ring concentric with a rotational axis of one of the gimbals. The slip ring may be configured to pass electrical signals to and from the inner part of the component housing 140. Alternatively or additionally, a wireless transceiver may be included for the control unit 150 to communicate wirelessly with the drone.

While the gimbal arms 131, 132 are illustrated for schematic purposes as planar square elements, numerous other shapes or configurations may be used to pivotally connect the three gimbals 111, 112, 113. For example, the gimbal arms 131, 132 may have a yoke-like or U-shaped configuration attaching two opposed pivot points. Alternatively, the gimbal arms 131, 132 may arch between two orthogonal pivot point (i.e., extending only ninety degrees).

The gimbaled universal drone controller 100 is illustrated in FIG. 1 using a three-dimensional Cartesian space having an x-axis, a y-axis, and a z-axis (indicated as "x," "y," and "z" respectively on opposed ends of each axis), which may be used as a frame of reference for determining attitude, heading, and stability of the gimbaled universal drone controller 100, the drone, or a combination thereof.

A wide range of vehicles and applications may make use of the gimbaled universal drone controller 100 according to various embodiments. Some non-limiting examples of vehicles and applications that may utilize the gimbaled universal drone controller include machinery, aeronautical vehicles, aerospace vehicles, motor vehicles, waterborne vehicles, medical devices, robots, toys, appliances, electronics, and any apparatus that might benefit from motion stability and control.

Figure 2:
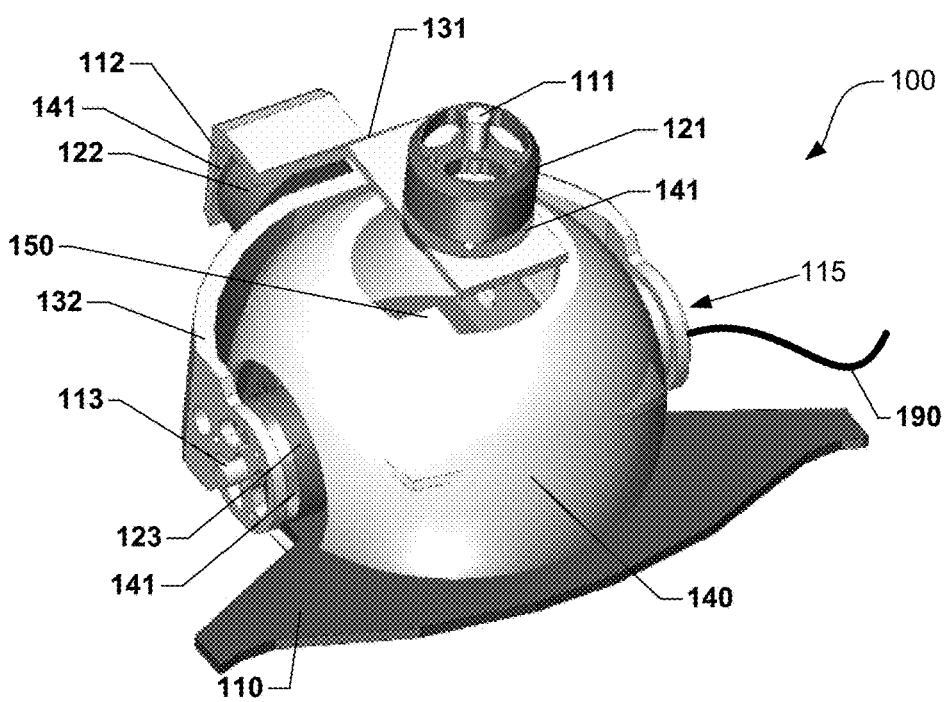
FIG. 2 is a perspective view of a gimbaled universal drone controller according to various embodiments.

In various embodiments, the gimbaled universal drone controller 100 may be a spherical or substantially spherical component, as illustrated in FIG. 2. With reference to FIGS. 1-2, the gimbaled universal drone controller 100 includes three gimbals 111, 112, 113 pivotally coupled to rotate orthogonally relative to each other. The three gimbals 111, 112, 113 include gimbal arms 131, 132 that extend between and pivotally couple the three gimbals 111, 112, 113 to one another. The outer gimbal 111 may be pivotally coupled to the drone and the inner gimbal 113 may support the inner platform 110 for receiving components thereon. The inner platform 110 may support the control unit 150, as well as support structures 142 fixing the component housing 140 relative to the inner platform 110. The inner platform 110 may support the control unit 150, including a gimbal processor (e.g., 520 in FIG. 5) and an IMU (e.g., 525 in FIG. 5), which may be configured to control pivotal movement of the two or more gimbals 111, 112, 113. The wiring port 115 may provide access for wires and/or cables, such as the wired connection 190, which may provide a communication connection between the gimbal processor 520 and the drone. The wired connection 190 may thus be used to exchange signals with the drone for actively controlling stabilization thereof.

The gimbaled universal drone controller 100 may include separate drivers 121, 122, 123 configured to rotate a respective one of the three gimbals 111, 112, 113. The drivers 121, 122, 123 may include any mechanism for effecting a suitable or desired force (and/or torque). Example drivers may include linear motors, rotary motors, stepper motors, servomotors, brushed motors, brushless motors, DC motors, AC motors, limited angle motors, and so on. These motors may be mixed or matched as desired or appropriate. The control unit 150 may control a current or other mechanism used to selectively actuate one or more of the drivers 121, 122, 123.

The drivers 121, 122, 123 may each include vibration dampening elements 141 to reduce vibrations being conveyed from one gimbal to another. Similarly, mounts between the control unit 150 and the inner platform 110 may include dampeners to reduce vibrations there between.

An encoder may be included with each of the drivers 121, 122, 123 to provide feedback to the control unit of the angular position of each of the three gimbals 111, 112, 113, respectively. Alternatively or additionally, each of the three gimbals 111, 112, 113 may include an IMU coupled to the control unit 150 for providing absolute position information for each of the three gimbals 111, 112, 113 relative to the inner platform 110 and the control unit 150 mounted thereon.

FIGS. 3A-3H illustrate the gimbaled universal drone controller 100 of FIG. 2, but with the component housing 140 being transparent, and thus revealing internal components according to various embodiments. With reference to FIGS. 1-3H, the gimbaled universal drone controller 100 may include various components such as the two or more gimbals 111, 112, 113 pivotally coupled to rotate orthogonally relative to each other. In various embodiments, the inner gimbal 113 supports the inner platform 110 for receiving components thereon.

Figure 3A:
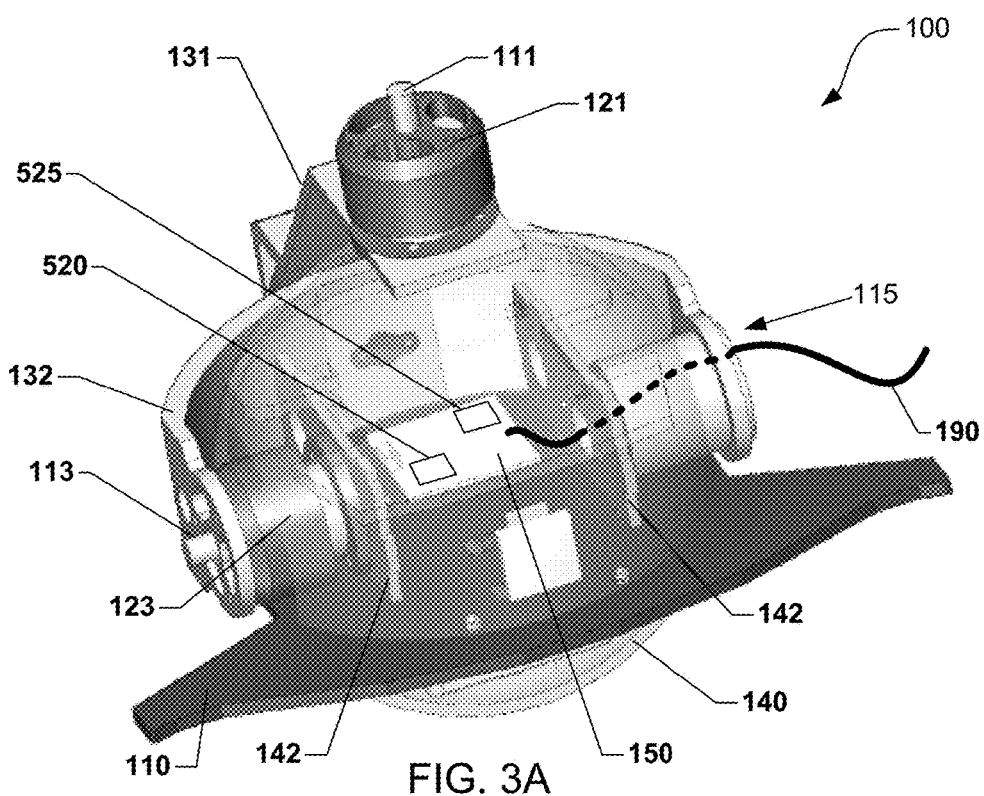
FIG. 3A is a front perspective view of the gimbaled universal drone controller of FIG. 2, with a transparent component housing revealing components therein according to various embodiments.
Figure 3B:
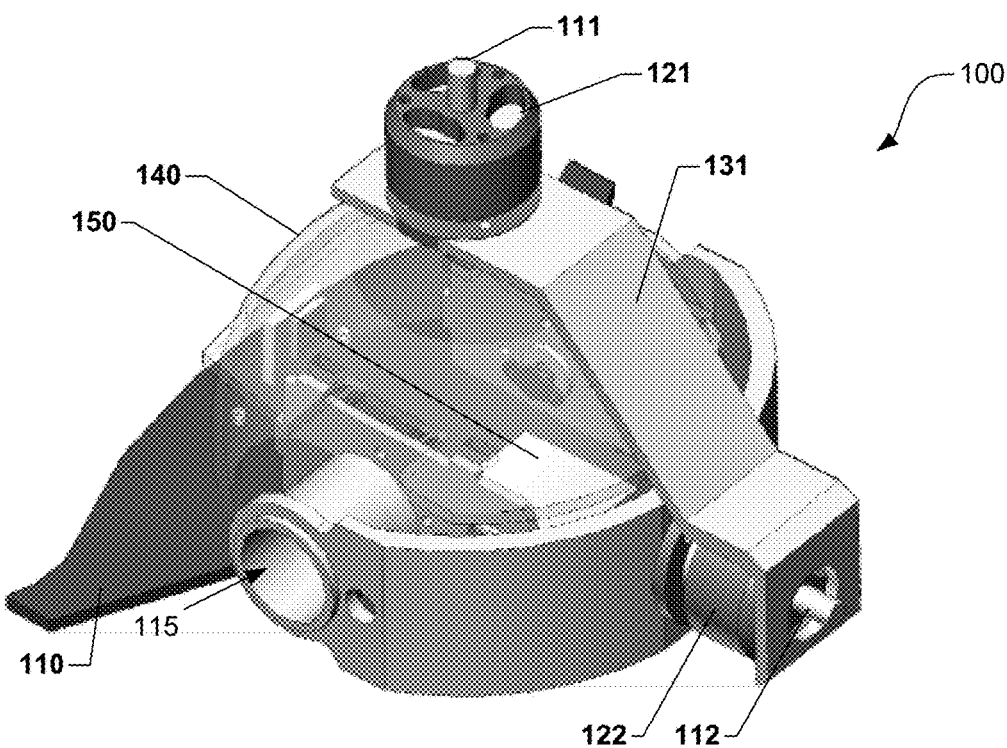
FIG. 3B is a rear perspective view of the gimbaled universal drone controller of FIG. 2, according to various embodiments.
Figures 3C, 3D:
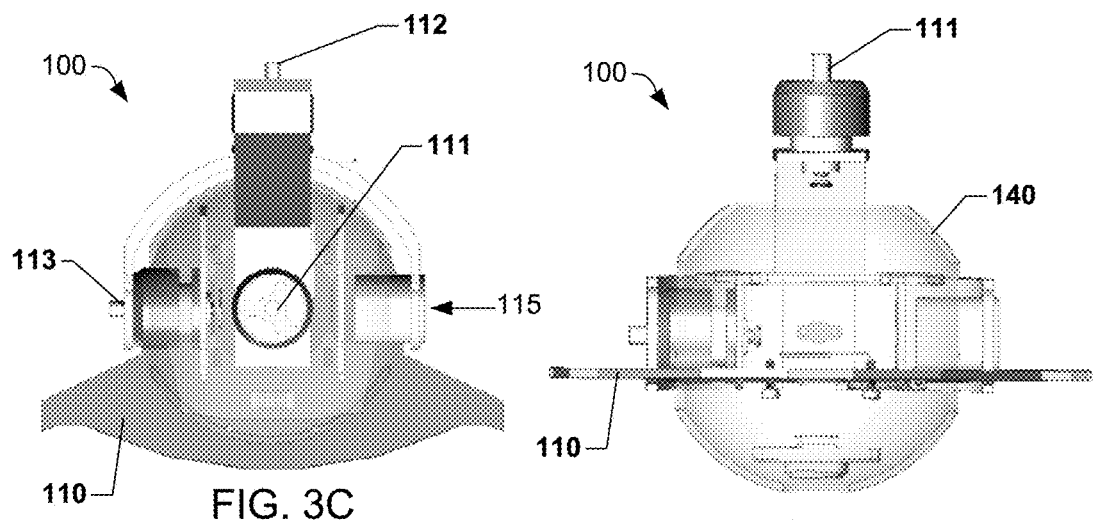
FIG. 3C is a top view of the gimbaled universal drone controller of FIG. 2, according to various embodiments.
FIG. 3D is a front view of the gimbaled universal drone controller of FIG. 2, according to various embodiments.
Figures 3E, 3F:
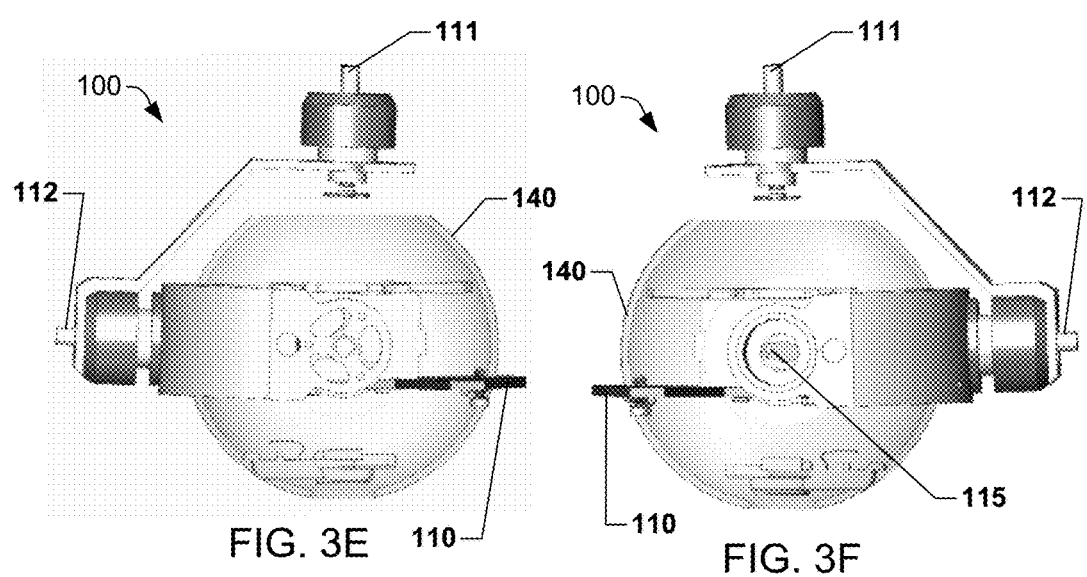
FIG. 3E is a left side view of the gimbaled universal drone controller of FIG. 2, according to various embodiments.
FIG. 3F is a right side view of the gimbaled universal drone controller of FIG. 2, according to various embodiments.
Figures 3G, 3H:
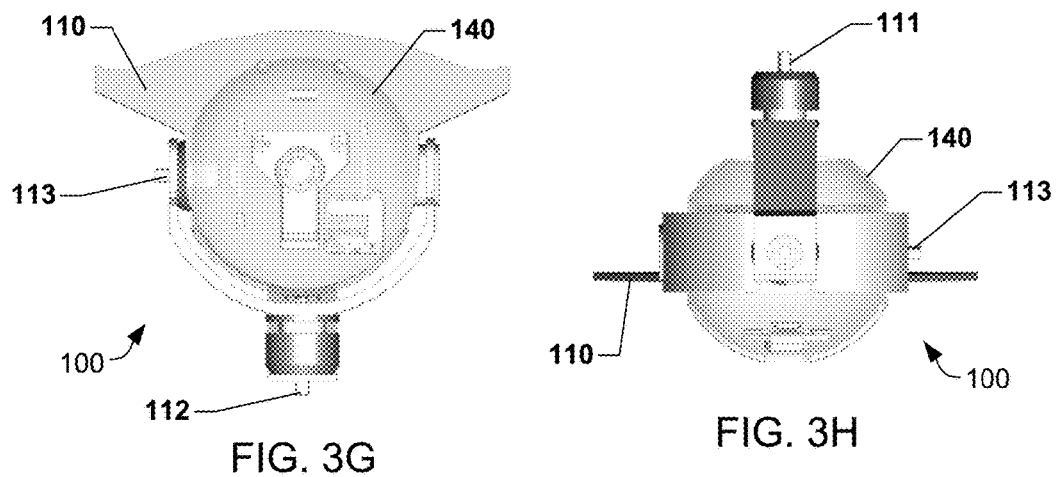
FIG. 3G is a bottom view of the gimbaled universal drone controller of FIG. 2, according to various embodiments.
FIG. 3H is a rear elevation view of the gimbaled universal drone controller of FIG. 2, according to various embodiments.

FIGS. 3A and 3B particularly illustrate front and rear perspective views, respectively, of the gimbaled universal drone controller 100. With reference to FIGS. 1-3B, the inner platform 110 may be partially disposed within the component housing 140 and partially disposed outside the component housing 140.

FIGS. 3C-3H illustrate, top, front, left side, right side, bottom, and rear views of the gimbaled universal drone controller 100 of FIGS. 3A and 3B, according to various embodiments.

Figure 4:
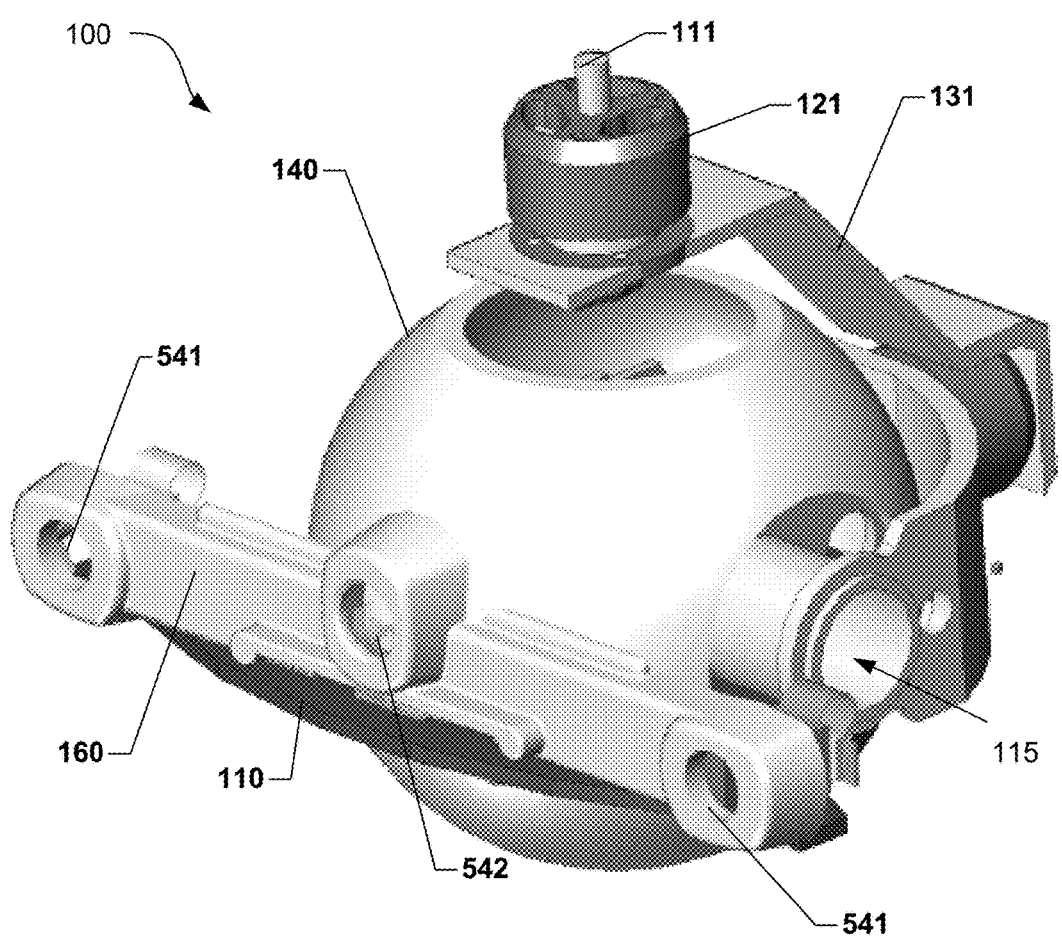
FIG. 4 is a perspective view of a gimbaled universal drone controller with external sensors according to various embodiments.

In various embodiments, the gimbal universal drone controller 100 may include peripheral components, as illustrated in FIG. 4. With reference to FIGS. 1-4, the gimbaled universal drone controller 100 may include a sensor housing 160, which may protect peripheral components like camera(s) 541, sensor(s) 542, and/or the like.

Figure 5:
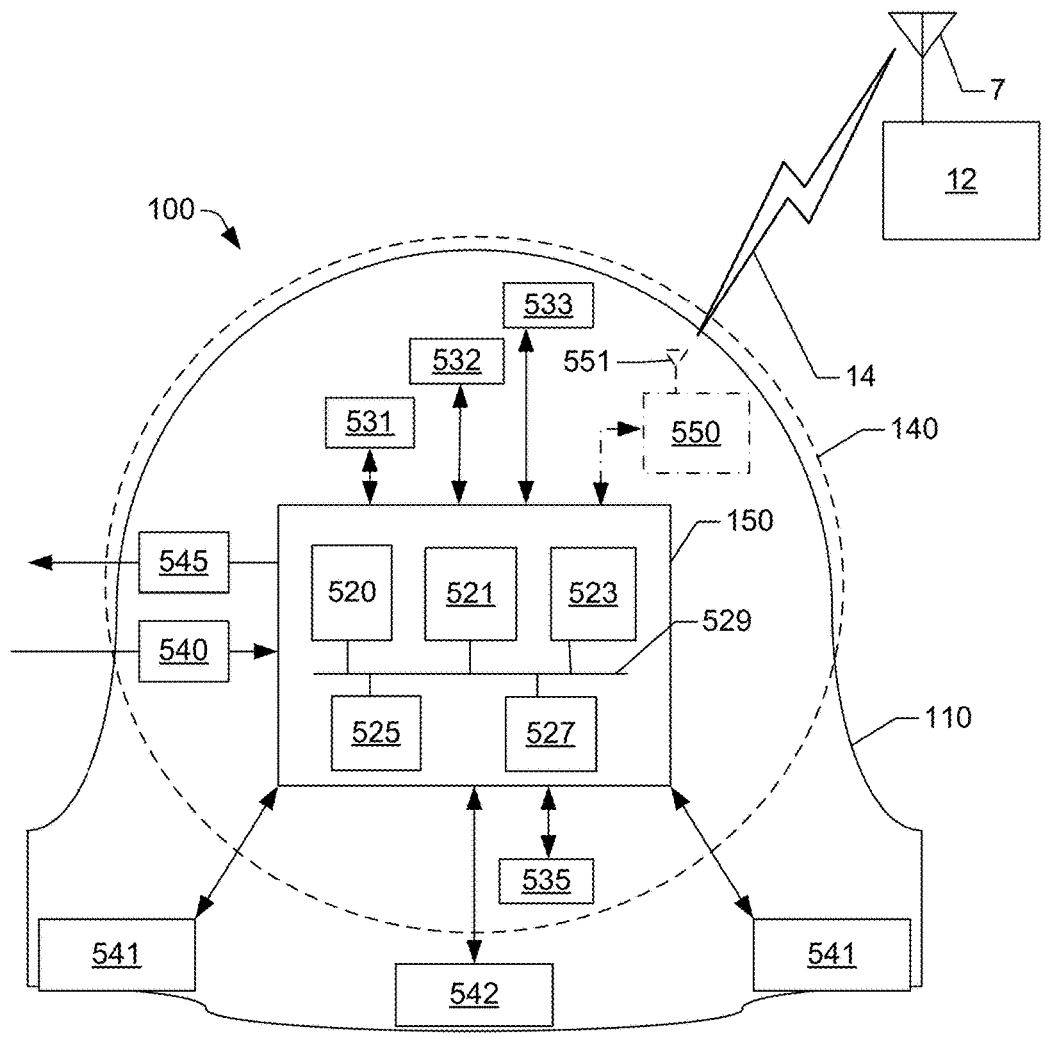
FIG. 5 is a component diagram of a gimbaled universal drone controller according to various embodiments.

FIG. 5 is a component block diagram of a gimbaled universal drone controller 100 according to various embodiments. With reference to FIGS. 1-5, the gimbaled universal drone controller 100 may include the inner platform 110 that supports various circuits and devices used to power and/or control the operation of the gimbaled universal drone controller 100, as well as a drone coupled thereto. In addition, the inner platform 110 may support the component housing 140 that may house many of the circuits and devices of the gimbaled universal drone controller 100. For example, the component housing 140 may house the control unit 150, a power module 535, an input module 540, an output module 545, and three gimbal modules 531, 532, 533. The control unit 150 may include a gimbal processor 520 coupled to memory 521, a navigation unit 523, an IMU 525, and an avionics module 527 all via communication bus 529. The gimbal processor 520 may be configured with processor-executable instructions to control pivotal movement of the gimbals, as well as control flight and other operations of a drone, including operations of the various embodiments.

The gimbaled universal drone controller 100 may have stored in the memory 521 different flight control rules customized for different types of drones. For example, flight control rules for a quad-coptor, sect copter, a plane, or any of a variety of drones may be accesses by the gimbal processor to accommodate and properly control any drone.

The control unit 150, and particularly the gimbal processor 520, may be coupled to the one or more cameras 541, one or more (other) sensors 542, and/or the like. The cameras 541 may include one or more image capturing devices. More than one image-capturing device may be configured to contemporaneously capture two different images for providing stereoscopic visualization. The one or more other sensors 542 may be position sensors, such as pressure sensors (i.e., for detecting wind, lift, drag, or changes therein), a motion sensor, or other sensors. The one or more other sensors 542 may be analog sensors or absolute position encoders that are configured to determine a relative position of the gimbal universal drone controller 100, as well as the drone coupled thereto, relative to the real world and/or the drone, including components thereof.

The gimbaled universal drone controller 100 may receive inputs including power (i.e., battery power from the drone, e.g., 600 in FIGS. 6-7B), signals from external components (e.g., GPS, magnetometer, camera, and/or IMU), which may work in conjunction with similar internal components. The power input may be used to drive motors that move the gimbals (e.g., brushless motor and/or electronic motor controllers) and one or more processors and sensors fixed relative to the inner platform (e.g., 110).

The gimbaled universal drone controller 100 may output motor output commands that control movement and stability of the drone, such as to an electronic speed control (ESC). The output may include data signals communicated to a transceiver in conjunction with an antenna to remote components, such as sensors and data gathering sources. The output connection may include wired connections, such as one or more serial connections, controller area network (CAN) connections, and/or fixed-pin connections.

The power module 535 may include one or more batteries that may provide power to various components, including the gimbal processor 520, the three gimbal modules 531, 532, 533, the input module 540, the one or more cameras 541, the sensor(s) 542, the input module 540, the output module 545, and a radio module 550. In addition, the power module 535 may include energy storage components, such as rechargeable batteries. The gimbal processor 520 may be configured with processor-executable instructions to control the charging of the power module 535, such as by executing a charging control algorithm using a charge control circuit. Alternatively or additionally, the power module 535 may be configured to manage its own charging. The gimbal processor 520 may be coupled to an output module 545, which may output control signals for managing operations of the drone or components thereof.

Through control of individual ones of the three-gimbal modules 531, 532, 533, the gimbal processor 520 may control pivotal movement of each of the gimbals. The gimbal processor 520 may receive data from the navigation unit 523 and/or the IMU 525 and use such data in order to determine the present position and orientation of the gimbaled universal drone controller 100 or components thereof. In various embodiments, the navigation unit 523 may include a global navigation satellite system (GNSS) receiver system (e.g., one or more Global Positioning System (GPS) receivers) enabling the gimbaled universal drone controller 100 to navigate using GNSS signals. Alternatively or in addition, the navigation unit 523 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other drones, etc.

The gimbal processor 520 may be configured to communicate with a remote computing device through a wireless connection (e.g., a cellular data network) to receive commands to use or stop using protocols, receive data useful in navigation, provide real-time position altitude reports, and assess data. The avionics module 527 coupled to the gimbal processor 520, the navigation unit 523, and/or the IMU 525 may be configured to provide flight control-related information such as altitude, attitude, airspeed, heading and similar information that the navigation unit 523 may use for navigation purposes, such as dead reckoning between GNSS position updates. The avionics module 527 may include or receive data from the IMU 525 that provides data regarding the orientation and accelerations of the gimbaled universal drone controller 100, the drone, or both, which may be used in navigation and positioning calculations, as well as some of the embodiments.

Alternatively, the radio module 550 may be included, which may be configured to receive wireless signals 14 via an antenna 551. Received wireless signals may include, for example, command signals to perform various flight maneuvers, signals from aviation navigation facilities, etc. The radio module 550 may provide such signals to the gimbal processor 520, the navigation unit 523, and/or the IMU 525 to assist in operation of the gimbaled universal drone controller 100 and/or the drone. In some embodiments, commands for navigating the gimbaled universal drone controller 100 and/or the drone, or components thereof may be received via the radio module 550. In some embodiments, the gimbaled universal drone controller 100 may receive signals from the remote computing device 12 via uplink signals sent from an antenna 7 via the wireless signals 14.

In various embodiments, the gimbaled universal drone controller 100 may output commands and/or data signals through the wireless signals 14. The wireless signals 14 may alternatively be used as a backup mechanism for communicating, in case a wired connection is not functioning properly. As a further alternative, the gimbaled universal drone controller 100 that includes the radio module 550 may also include an internal source, such as batteries on the inner platform 110. Such a gimbaled universal drone controller 100 that is wireless and self-powered may be easily connected to a drone 600 without the need for numerous wired connections.

In some embodiments, the radio module 550 may be configured to switch between a cellular connection and a Wi-Fi or other form of radio connection depending on the location and altitude of the gimbaled universal drone controller 100. For example, while in flight or otherwise moving, the radio module 550 may communicate with a cellular infrastructure in order to maintain communications with a remote server. In addition, communications with the remote computing device 12 may be established using cellular telephone networks while the gimbaled universal drone controller 100 and/or drone is out of line-of-sight of the remote computing device 12. Communication between the radio module 550 and the operator communication link may transition to a short-range communication link, such as the wireless signals 14 (e.g., Wi-Fi), when the gimbaled universal drone controller 100 moves closer to the remote computing device 12. Similarly, the gimbaled universal drone controller 100 may include and employ other forms of radio communication, such as mesh connections with other gimbaled universal drone controllers or connections to other information sources (e.g., balloons or other stations for collecting and/or distributing weather or other data harvesting information).

In various embodiments, the control unit 150 may be equipped with the input module 540, which may be used for a variety of applications. For example, the input module 540 may receive and pre-process images or data from an onboard component, such as camera 541 or sensor(s) 542, or may receive electronic signals from other components (e.g., a payload). The input module 540 may receive an activation signal for causing actuators on the gimbaled universal drone controller 100 and/or the drone to deploy landing cushions or similar components for affecting an emergency landing. In addition, the output module 545 may be used to activate components (e.g., an energy cell, an actuator, an indicator, a circuit element, a sensor, and/or an energy-harvesting element).

While the various components of the gimbaled universal drone controller 100 are illustrated as separate components, some or all of the components (e.g., the gimbal processor 520, the output module 545, the radio module 550, and other units) may be integrated together in a single device or module, such as a system-on-chip (SoC).

For ease of description and illustration, some detailed aspects of the gimbaled universal drone controller 100 are omitted, such as wiring, frame structure, power source, or other features that would be known to one of skill in the art. In addition, although the example gimbaled universal drone controllers are illustrated as spherical devices, the gimbaled universal drone controller 100 may have similar or different configurations and/or other aspects.

Figure 6:
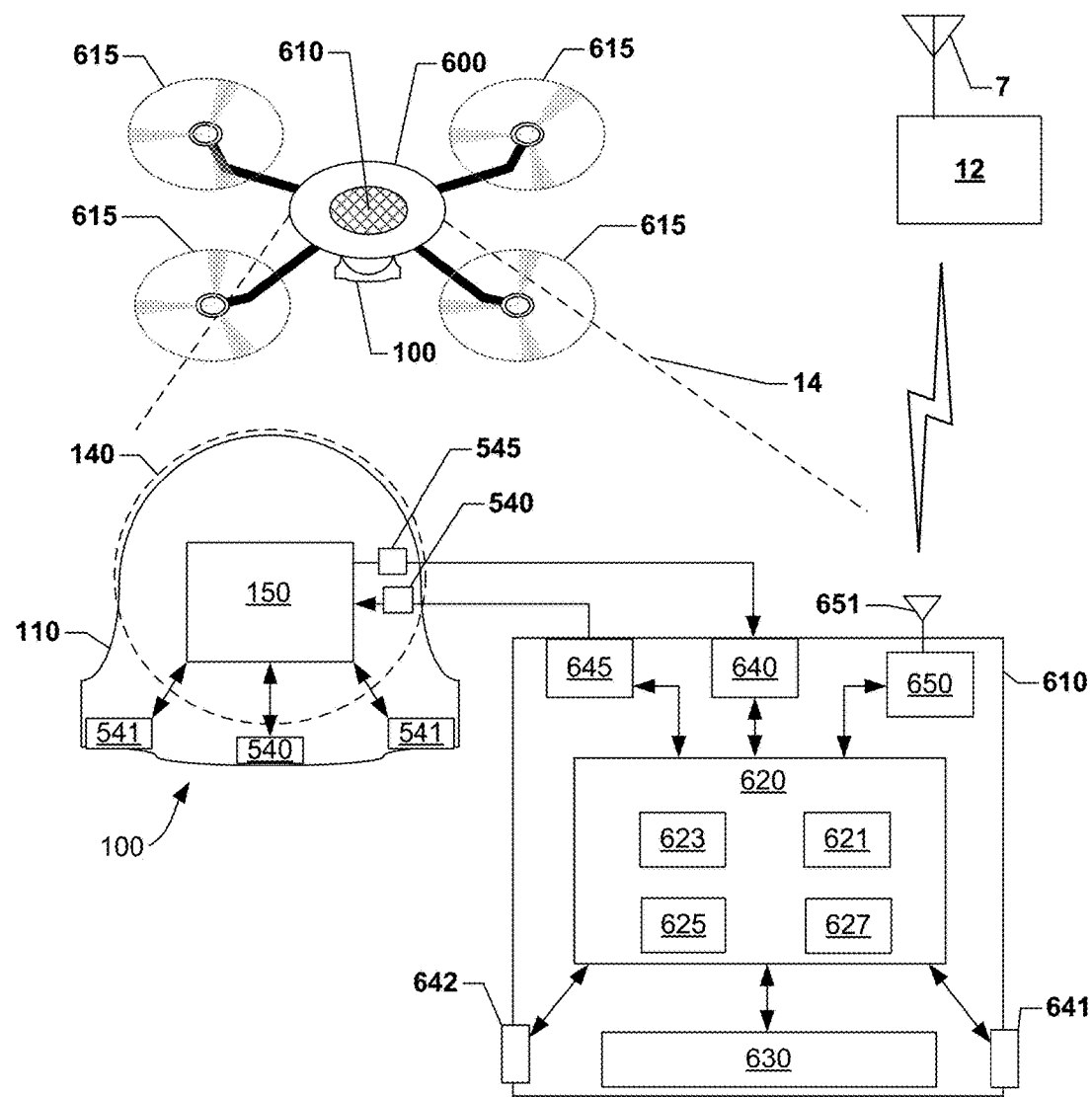
FIG. 6 is a perspective view of a drone with a schematic relief diagram of a gimbaled universal drone controller, a drone control unit, and a mobile computing device according to various embodiments.

FIG. 6 illustrates a configuration of a drone 600 that may be used in conjunction with various embodiments. With reference to FIGS. 1-6, the drone 600 may include the gimbaled universal drone controller 100 coupled thereto. The gimbaled universal drone controller 100 is illustrated as being disposed on a lower side of the drone 600. However, in accordance with various embodiments the gimbaled universal drone controller 100 may be secured almost anywhere on the drone 600.

The drone 600 may include a control unit 610 of its own that may house various circuits and devices used to power and control the operation of the drone 600, such as when directed by or not controlled by the gimbaled universal drone controller 100. The control unit 610 may include a processor 620, a power module 630, an input module 640, an additional camera 641, sensor(s) 642, an output module 645, and a radio module 650 coupled to an antenna 651. The processor 620 may include or be coupled to memory 621 and a navigation unit 623. The processor 620 may be configured with processor-executable instructions to control flight and other operations of the drone 600, including operations of the various embodiments.

The power module 630 may include one or more batteries that may provide power to various components, including the processor 620, the input module 640, the sensor(s) 642, the output module 645, and the radio module 650. The one or more batteries may supply power to the gimbaled universal drone controller 100 through the wired connection (e.g., 190). In addition, the power module 630 may include energy storage components, such as rechargeable batteries. The processor 620 may be configured with processor-executable instructions to control the charging of the power module 630, such as by executing a charging control algorithm using a charge control circuit. Alternatively or additionally, the power module 630 may be configured to manage its own charging. The processor 620 may be coupled to an output module 645, which may output control signals for managing the motors that drive the rotors 615 and other components. The processor 620 may act as a slave processor to the gimbal processor (e.g., 520 in the control unit 150) operating as a master. In this way, the gimbal processor may coordinate the operations of the drone 600.

Through control of the individual motors of the rotors 615, the drone 600 may be controlled in flight. The processor 620 may receive data and/or instructions from the gimbaled universal drone controller 100 and use such data in order to change a present position, speed, and/or orientation of the drone 600, as well as an appropriate course or attitude change. In various embodiments, the navigation unit 623 may include a global navigation satellite system (GNSS) receiver system (e.g., one or more Global Positioning System (GPS) receivers) enabling the drone 600 to navigate using GNSS signals. Alternatively or in addition, the navigation unit 623 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other drones, etc.

The processor 620 and/or the navigation unit 623 may be configured to communicate with a server through a wireless connection (e.g., a cellular data network) to receive commands to use or stop using the extended flight protocol, receive data useful in navigation, provide real-time position altitude reports, and assess data. An avionics module 627 coupled to the processor 620 and/or the navigation unit 623 may be configured to provide flight control-related information such as altitude, attitude, airspeed, heading and similar information that the navigation unit 623 may use for navigation purposes, such as dead reckoning between GNSS position updates. The avionics module 627 may include or receive data from a gyro/accelerometer unit 625 that provides data regarding the orientation and accelerations of the drone 600 that may be used in navigation and positioning calculations, as well as some of the embodiments.

The gimbaled universal drone controller 100 may be configured to communicate with a server or other remote computing device through a wireless connection provided by the drone 600 (e.g., a cellular data network) to receive data useful in navigation, provide real-time position altitude reports, and assess data. For example, the radio module 650 may be configured to receive signals via the antenna 651, such as command signals to perform various flight maneuvers, receive signals from aviation navigation facilities, etc., and provide such signals to the processor 620 and/or the gimbaled universal drone controller 100 to assist in operation of the drone 600. In some embodiments, commands for navigating the drone 600, or components thereof may be received via the radio module 650 and communicated to the gimbaled universal drone controller 100. In some embodiments, the drone 600 may receive signals from the remote computing device 12 via uplink signals sent from an antenna 7 via the wireless signals 14.

In various embodiments, the control unit 610 may be equipped with the input module 640, which may be used for a variety of applications. For example, the input module 640 may receive and pre-process images or data from the gimbaled universal drone controller 100, or may receive electronic signals from other components. The input module 640 may receive an activation signal for causing actuators on the drone 600 to deploy landing cushions or similar components for affecting an emergency landing. In contrast, the output module 645 may be used to communicate data to the gimbaled universal drone controller 100. In addition, the output module 645 may be used to activate components (e.g., an energy cell, an actuator, an indicator, a circuit element, a sensor, and/or an energy-harvesting element).

The gimbaled universal drone controller 100 may include one or more calibration procedures. The processor may calibrate measurements of the IMU's and sensors at various stages of drone operation. For example, a preliminary calibration protocol may run when the drone starts up, but is stationary on the ground. An intermediate calibration protocol may run when the drone starts moving and/or when propulsion units start up. A moving calibration protocol may run once the drone is moving so the processor may assess reactions to actions executed by the processor for learning desired effects.

For ease of description and illustration, some detailed aspects of the drone 600 are omitted, such as wiring, frame structure, power source, landing columns/gear, or other features that would be known to one of skill in the art. In addition, although the example drones are illustrated as quad copters with four rotors, the drones may include more or fewer than four rotors or be a completely different type of unmanned autonomous vehicle.

For ease of description and illustration, some detailed aspects of the gimbaled universal drone controller 100 are omitted, such as wiring, frame structure, interconnects, or other features that would be known to one of skill in the art. For example, while the gimbaled universal drone controller 100 is shown and described as having a component housing 140 and a separate inner platform 110, the gimbaled universal drone controller 100 may be constructed using a molded frame in which such support and/or housing structures are obtained through the molded structure.

Figure 7A:
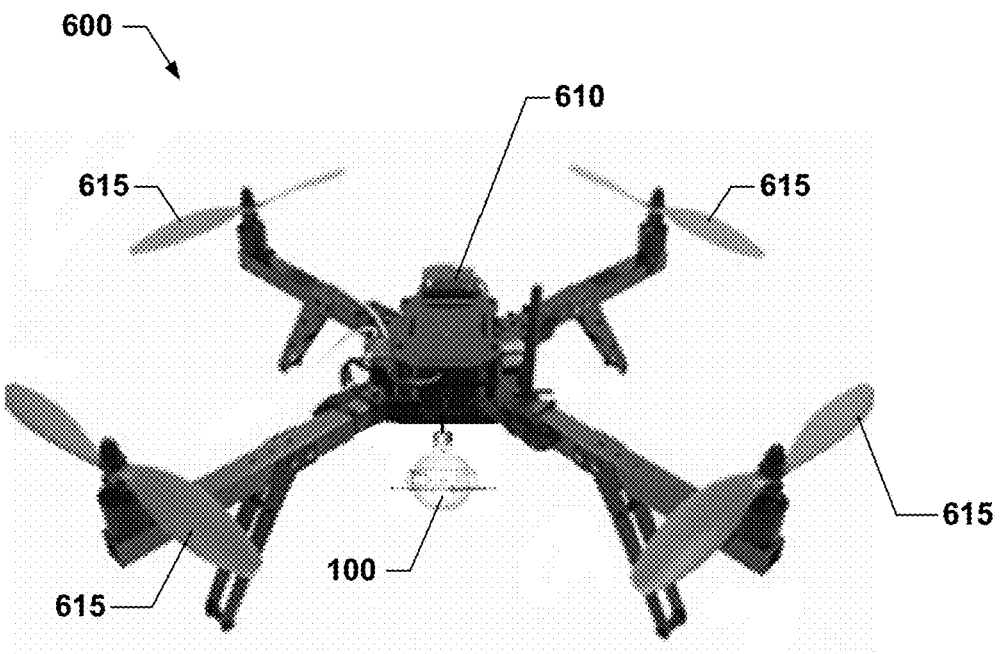
FIG. 7A is a perspective view of a drone with a gimbaled universal drone controller according to various embodiments.

FIG. 7A illustrates a drone (e.g., 600) including a gimbaled universal drone controller 100 in accordance with various embodiments. With reference to FIGS. 1-7A, the drone 600 may use various components, such as the gimbaled universal drone controller 100, to manage operation of the rotors 615 and other components of the drone 600.

Figure 7B:
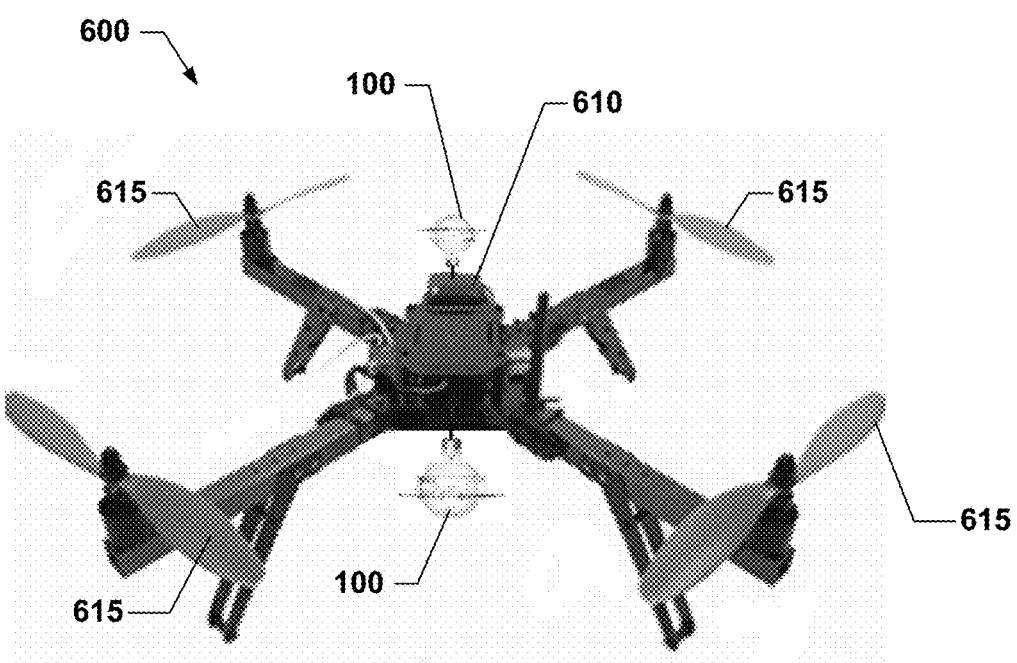
FIG. 7B is a perspective view of a drone with two gimbaled universal drone controllers according to various embodiments.

FIG. 7B illustrates the drone 600 with two gimbaled universal drone controllers 100 in accordance with some embodiments. With reference to FIGS. 1-7B, the drone 600 may use the two gimbaled universal drone controllers 100 to provide stereoscopic sensing for more accurate attitude, movement, and stability control. The plurality of gimbaled universal drone controllers 100 may cooperate, working together redundantly and/or using a master/slave relationship. By including one or more cameras on each of the gimbaled universal drone controllers 100, a drone 600 is provided with a system that can obtain visual images correlated to absolute relative positions. Using the two gimbaled universal drone controllers 100 may provide more accurate navigational and stabilization control. The two gimbaled universal drone controllers 100 may also provide redundancies for the drone 600 in case one of the gimbaled universal drone controllers 100 is malfunctioning or otherwise not operating effectively.

Although flight gimbals are often located on the bottom of a drone, various embodiments may locate at least one gimbaled universal drone controller 100 on an upper or other surface of the drone 600.

In some embodiments, more than one gimbaled universal drone controller 100 may be used together on a single drone. A plurality of gimbaled universal drone controllers 100 may capture stereoscopic imagery.

Although the gimbaled universal drone controller(s) 100 illustrated in FIGS. 7A and 7B are used on aerial drones, the embodiments are not limited to aerial vehicles or vehicles of any type and may be implemented in or on any frame. Various embodiments are described with reference to a drone, particularly an aerial drone, for ease of reference. However, the description of the gimbal universal drone controller 100 used with a drone is not intended to limit the scope of the claims to aerial drones.

Figure 8:
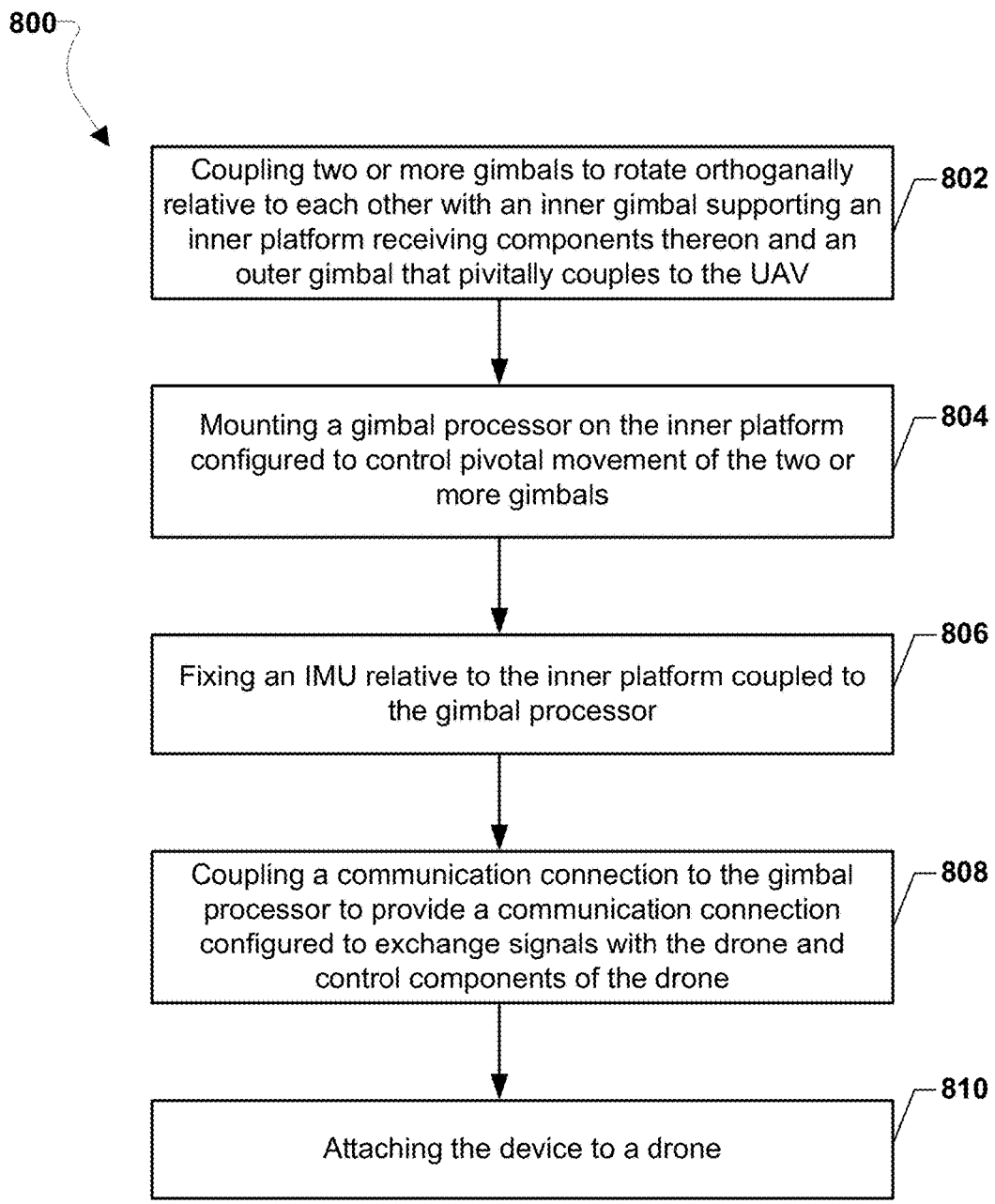
FIG. 8 is a process flow diagram illustrating a method of assembling a gimbal universal drone controller according to various embodiments.

FIG. 8 illustrates a method 800 of manufacturing a gimbaled universal drone controller and a drone using such a controller according to some embodiments. In block 802, two or more gimbals may be coupled together so that the gimbals rotate orthogonally relative to each other. The two or more gimbals may be assemble so that an inner gimbal of the two or more gimbals supports an inner platform configured for receiving components thereon, and so an outer gimbal of the two or more gimbals pivotally can be coupled to a drone.

In block 804, a gimbal processor and an inertial measurement unit (IMU) may be mounted on the inner platform. The gimbal processor may be configured to control pivotal movement of the two or more gimbals. The gimbal processor may be coupled to the IMU to receive data signals.

In block 806, a communication connection may be coupled to the gimbal processor. The communication connection may be configured to exchange signals with the drone to enable the gimbal processor to receive information from drone sensors and send commands to controllable components on the drone for controlling operations of the drone. At this point, the gimbaled universal drone controller may be attached to any form of autonomous or semi-autonomous vehicle or drone.

In block 808, the gimbaled universal drone controller may be connected to the drone so that the gimbal processor can provide control signals to controllable components on the drone. This operation may include mechanically attaching the gimbaled universal drone controller to a structure of the drone and connecting drone sensor outputs and controllable components to the communication connection.

The various embodiments illustrated and described are provided merely as examples to illustrate various features of the claims. However, features shown and described with respect to any given embodiment are not necessarily limited to the associated embodiment and may be used or combined with other embodiments that are shown and/or described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a processor. As used herein, the term "processor" refers to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A device for use on a drone, the device comprising:
   two or more gimbals pivotally coupled to rotate orthogonally relative to each other, wherein an inner gimbal of the two or more gimbals supports an inner platform for receiving components thereon, wherein an outer gimbal of the two or more gimbals pivotally couples to the drone;
   a gimbal processor mounted on the inner platform, wherein the gimbal processor is configured to control pivotal movement of the two or more gimbals, wherein the outer gimbal pivots at least partially around the gimbal processor;
   an inertial measurement unit fixed relative to the inner platform and coupled to the gimbal processor;
   a vibration sensor configured to detect vibrations between the inner platform and the drone; and
   a communication connection coupled to the gimbal processor and configured to exchange signals with the drone for controlling operations of the drone.

2. The device of claim 1, further comprising:
   separate gimbal drivers coupled to the two or more gimbals, wherein each of the separate gimbal drivers is controlled by the gimbal processor and configured to rotate an individual one of the two or more gimbals.

3. The device of claim 1, wherein the gimbal processor coordinates operations of the drone with a drone processor of the drone.

4. The device of claim 3, wherein the drone processor operates as a slave to the gimbal processor operating as a master.

5. The device of claim 1, further comprising:
   at least one camera fixed to the inner one of the two or more gimbals and coupled to the gimbal processor, wherein the at least one camera is configured to capture an image of a heading of the device.

6. The device of claim 1, wherein the inertial measurement unit is configured to determine an attitude and heading of the device relative to surroundings of the drone.

7. The device of claim 6, wherein the inertial measurement unit is configured to determine at least one of a position or movement of the components of the drone relative to the device.

8. The device of claim 6, further comprising:
   a camera coupled to the inner platform and the gimbal processor, wherein the camera is configured to capture an image of a heading of the device.

9. The device of claim 1, wherein the two or more gimbals pivot concentrically.

10. The device of claim 1, wherein the two or more gimbals includes three or more gimbals.

11. A device for use on a drone, the device comprising:
    two or more means for pivotal support coupled to rotate orthogonally relative to each other, wherein an inner means for pivotal support, of the two or more means for pivotal support, supports an inner means for receiving components thereon, wherein an outer means for pivotal support of the two or more means for pivotal support couples to the drone;
    means for processing data mounted on the inner means for receiving components thereon, wherein the means for processing data is configured to control pivotal movement of the two or more means for pivotal support, wherein the outer means for pivotal support pivots at least partially around the means for processing data;
    means for measuring inertia fixed relative to the inner means for receiving components thereon and coupled to the means for processing data;
    means for detecting vibrations between the inner means for receiving components thereon and the drone; and
    means for communicating coupled to the means for processing data and configured to exchange signals with the drone for controlling operations of the drone.

12. A method of manufacturing a device for use on a drone, the method comprising:
    coupling two or more gimbals to rotate orthogonally relative to each other, wherein an inner gimbal of the two or more gimbals supports an inner platform for receiving components thereon, wherein an outer gimbal of the two or more gimbals can be pivotally coupled to the drone;
    mounting a gimbal processor on the inner platform, the gimbal processor configured to control pivotal movement of the two or more gimbals, wherein the outer gimbal pivots at least partially around the gimbal processor;
    fixing an inertial measurement unit (IMU) relative to the inner platform and coupled to the gimbal processor;
    attaching a vibration sensor to the device, the vibration sensor configured to detect vibrations between the inner platform and the drone; and
    coupling a communication connection to the gimbal processor, the communication connection configured to exchange signals with the drone for controlling operations of the drone.

13. The method of claim 12, further comprising coupling the device to the drone.

14. The method of claim 13, wherein coupling the device to the drone comprises:
    mechanically attaching the device to a structure of the drone; and
    connecting drone sensor outputs and controllable components to the communication connection.

15. The method of claim 12, wherein coupling two or more gimbals to rotate orthogonally relative to each other comprises coupling separate gimbal drivers to the two or more gimbals and coupling the separate gimbal drivers to the gimbal processor, wherein each of the separate gimbal drivers is configured to rotate an individual one of the two or more gimbals.

16. The method of claim 12, further comprising fixing at least one camera to the inner one of the two or more gimbals and coupling the at least one camera to the gimbal processor, wherein the at least one camera is configured to capture an image of a heading of the device.

17. The method of claim 16, wherein fixing at least one camera to the inner one of the two or more gimbals comprises fixing the at least one camera to the inner one of the two or more gimbals so that the at least one camera is oriented to capture the image of the heading of the device.

18. The method of claim 12, wherein coupling two or more gimbals to rotate orthogonally relative to each other comprises coupling three or more gimbals to rotate orthogonally relative to each other.

19. The device of claim 1, further comprising:
    a component housing fixed relative to the inner platform, wherein the inner platform is disposed at least partially within the component housing.

20. The device of claim 11, further comprising:

means for housing the inner means for receiving components thereon, wherein the inner means for receiving components thereon is disposed at least partially within the means for housing the inner means for receiving components thereon.

21. The method of claim 12, further comprising:

fixing a component housing relative to the inner platform, wherein the inner platform is disposed at least partially within the component housing.

\* \* \* \* \*